US011655151B2

(12) United States Patent
Chomette et al.

(10) Patent No.: US 11,655,151 B2
(45) Date of Patent: May 23, 2023

(54) METHOD FOR PREPARING A VANADIUM PHOSPHATE

(71) Applicant: RHODIA OPERATIONS, Paris (FR)

(72) Inventors: Cyril Chomette, Aubervilliers (FR); Valérie Buissette, Aubervilliers (FR); Marc-David Braida, Aubervilliers (FR); Thierry Le Mercier, Aubervilliers (FR)

(73) Assignee: RHODIA OPERATIONS, Aubervilliers (FR)

( * ) Notice: Subject to any disclaimer, the term of this patent is extended or adjusted under 35 U.S.C. 154(b) by 600 days.

(21) Appl. No.: 16/623,259

(22) PCT Filed: Jun. 14, 2018

(86) PCT No.: PCT/FR2018/051420
§ 371 (c)(1),
(2) Date: Dec. 16, 2019

(87) PCT Pub. No.: WO2018/229447
PCT Pub. Date: Dec. 20, 2018

(65) Prior Publication Data
US 2021/0147236 A1    May 20, 2021

(30) Foreign Application Priority Data

Jun. 16, 2017  (FR) .................................... 1755505

(51) Int. Cl.
*C01B 25/37* (2006.01)
*C01B 25/45* (2006.01)
*C01B 25/455* (2006.01)

(52) U.S. Cl.
CPC .......... *C01B 25/372* (2013.01); *C01B 25/451* (2013.01); *C01B 25/455* (2013.01); *C01P 2002/72* (2013.01); *C01P 2004/03* (2013.01); *C01P 2004/61* (2013.01)

(58) Field of Classification Search
None
See application file for complete search history.

(56) References Cited

FOREIGN PATENT DOCUMENTS

CN    103594716 A  *  2/2014  ............ H01M 4/582

OTHER PUBLICATIONS

Serras et al., Electrochemical performance of mixed valence Na3V2O2x(PO4)2F3-2x/C as cathode for sodium-ion batteries, 2013, Journal of Power Sources, 241, 56-60 (Year: 2013).*

* cited by examiner

*Primary Examiner* — Daniel S Gatewood
(74) *Attorney, Agent, or Firm* — Osha Bergman Watanabe & Burton LLP

(57) ABSTRACT

The present invention relates to a process for preparing an ammonium vanadium phosphate of formula $(NH_4)(VO_2)(HPO_4)$. It also relates to a process for preparing a vanadium orthophosphate $VPO_4$.

18 Claims, 1 Drawing Sheet

METHOD FOR PREPARING A VANADIUM PHOSPHATE

The present application is a U.S. national stage entry under 35 U.S.C. 071 of International Application No. PCT/FR2018/051420 filed Jun. 14, 2018, which claims the priority of the prior French application, FR 1755505, filed at the INPI (French National Industrial Property Institute) on Jun. 16, 2017. The contents of each of these applications are incorporated entirely by reference into the present application. In case of inconsistency between the present application and the prior French application affecting the clarity of a term, reference is made exclusively to the present application.

The present invention relates to a process for preparing an ammonium vanadium phosphate of formula $(NH_4)(VO_2)(HPO_4)$. It also relates to a process for preparing a vanadium orthophosphate $VPO_4$ and also to a process for preparing NVPF. The invention also relates to an original process for preparing $VPO_4$. The $VPO_4$ may be used for the preparation of NVPF.

TECHNICAL PROBLEM

The compound $V^{III}PO_4$ (denoted hereinafter by $VPO_4$) is used as a chemical intermediate in the manufacture of NVPF which is the compound of formula $Na_3V_2(PO_4)_2F_3$ used in the cathodes of sodium batteries. As disclosed in Chem. Mater. 2016, 28, 7683-7692, it is necessary to carefully control the stoichiometry of the NVPF. In order to obtain batteries having a good efficiency, it is therefore preferable to use NVPF having an adequate purity. In particular, the $VPO_4$ used to produce the NVPF must contain as low as possible an amount of impurities, such as in particular $V(PO_3)_3$ and $V_2O_3$ and $VO_2$.

The $VPO_4$ is obtained by reduction of the phosphate of formula $(NH_4)(VO_2)(HPO_4)$ (denoted hereinafter by the term "vanadium phosphate"). This reduction may take place at high temperature in the presence of hydrogen or else by carboreduction by high-temperature heating of a mixture formed of $NH_4H_2PO_4$, of $V_2O_5$ and of carbon as is taught in U.S. Pat. No. 6,387,56 and also in Solid State Sciences 2006, 8, 1215-1221. The carboreduction reaction is then the following:

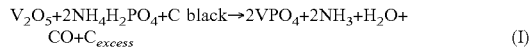
$$V_2O_5 + 2NH_4H_2PO_4 + C\ black \rightarrow 2VPO_4 + 2NH_3 + H_2O + CO + C_{excess} \quad (I)$$

Methods for preparing the vanadium phosphate from $NH_4H_2PO_4$ and $V_2O_5$ are known. The process described in Z. Naturforsch 1975, 30b, 334-339 is based on the addition of solid $V_2O_5$ to an aqueous solution of $NH_4H_2PO_4$ brought to boiling. In order to obtain the vanadium phosphate with a good state of purity, it is necessary to wash the precipitate, which reduces the yield (60%).

Another method described in Chem. J. Chin. Univ. 2000, 21, 1177-1179 is based on the reaction between $NH_4VO_3$ and $NH_4H_2PO_4$ in aqueous solution. However, the reaction leads to the release of $NH_3$ or of $NH_4^+$ in the discharges.

The technical problem to be solved therefore consisted in developing a process for preparing a vanadium phosphate of good purity, that is economical, with a good yield and that uses simple conditions.

In order to obtain a $VPO_4$ that has an adequate purity, it is necessary to use a vanadium phosphate that has a good purity. In particular, the vanadium phosphate must have a minimum content of residual $V_2O_5$, the decomposition of which during the reduction step results in the presence of $V_2O_3$ in the $VPO_4$. In the same way, the vanadium phosphate must have a minimum content of residual ammonium phosphate in order to prevent the formation of impurities that are rich in phosphorus element and that result in a $VPO_4$ of lower crystallinity.

TECHNICAL BACKGROUND

J. Power Sources 2014, 264, 123-127 describes the preparation of $VPO_4$ by mixing $V_2O_5$ and $NH_4H_2PO_4$ in water in the presence of citrate and the heating of the mixture at a temperature of 250° C. for 20 h, then the product is washed.

In the article "Vibrational Spectroscopic Investigation of Li Extraction from Monoclinic and Rhombohedral $Li_3V_2(PO_4)_3$," by Burba et al., $V_2O_5$ and $NH_4H_2PO_4$ are stirred in the solid state in acetone in the presence of $Li_2CO_3$ to result in $Li_3V_2(PO_4)_3$.

French application FR 3042313 describes, in a manner similar to U.S. Pat. No. 6,387,56, the mixing of $V_2O_5$ and of $NH_4H_2PO_4$ in the solid state, and the heating at high temperature (800° C.) of the solid mixture. The reaction results in $VPO_4$ and not in the vanadium phosphate. Furthermore no mention is made of a precursor mixture to which water is added as in the process of the present invention.

The scientific article "polyphosphovanadate" in Naturforshung 1975, vol. 30b, 334-339 describes on page 338 the preparation of $NH_4HVPO_6$ from $V_2O_5$ via a process using a large amount of water (300 g per 49.76 g of solids, i.e. an initial water/solids proportion of 602.9%>200%) brought to boiling ("zum sieden").

The scientific article J. Power Sources 2013, 241, 56-60 describes a process for producing $VPO_4$ by heating a mixture of $V_2O_5$ and of $NH_4H_2PO_4$ at a temperature of 300° C. or 850° C.

FIGURES

Figure 1:
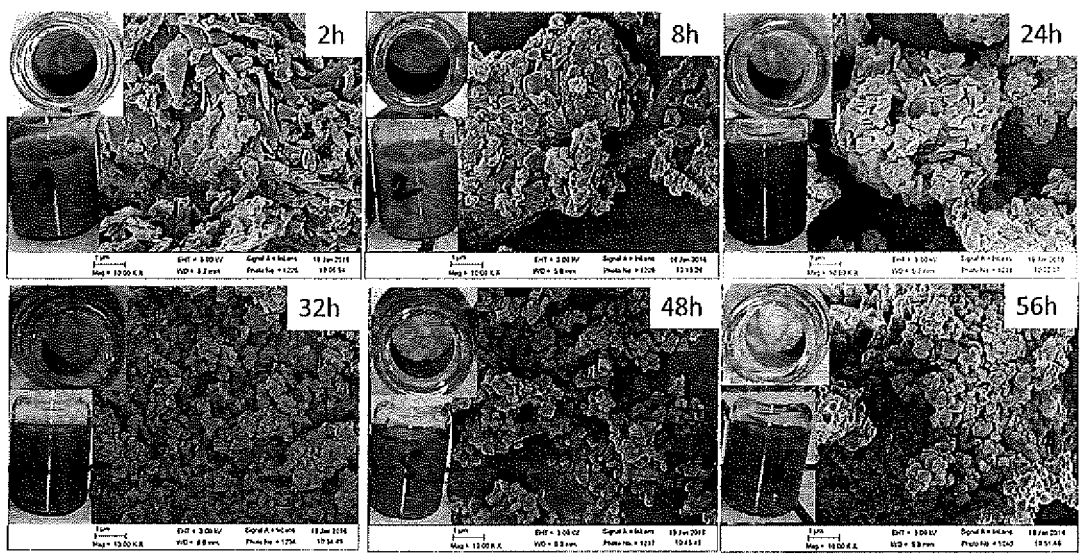
FIG. 1 represents the evolution of the SEM microscopy images of the mixture of example 1 over time. Also represented are the samples drawn off and placed in water (visual method described below).
Figure 2:
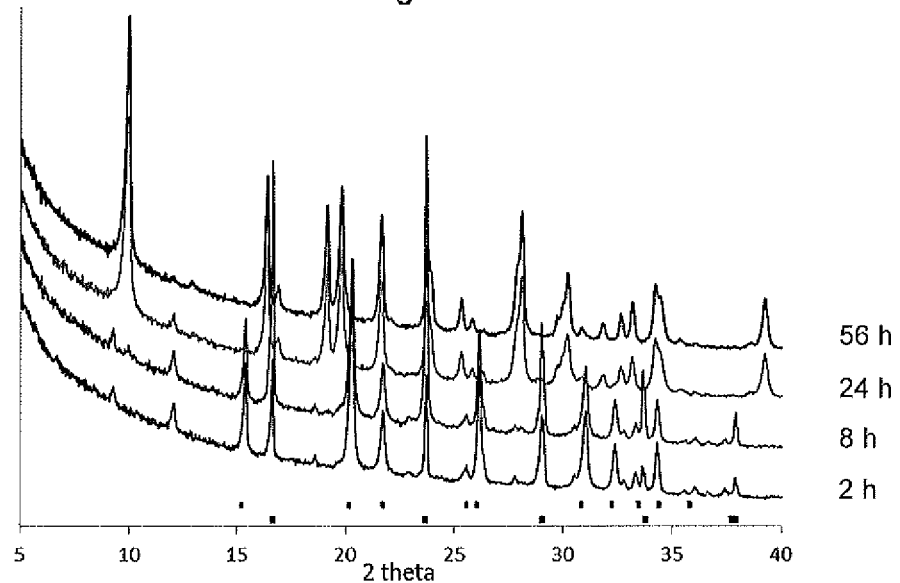
FIG. 2 represents the evolution of the diffractograms (intensity vs 2θ-2theta angle) of the mixture of example 1 over time.
Figure 3:
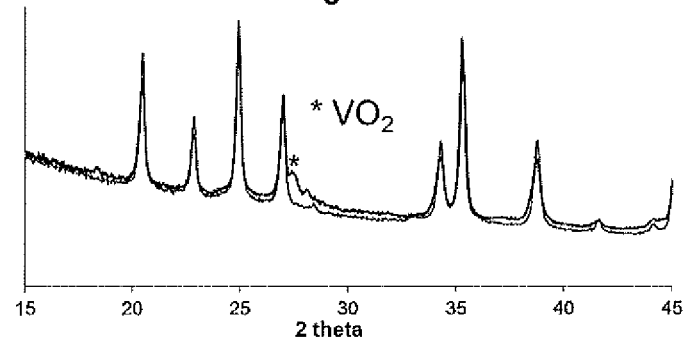

FIG. 3 represents the diffractogram of the mixture of example 4 after calcination at 800° C. in air of a vanadium phosphate prepared from a mixture containing 500% of added water. The formation of $VPO_4$ and of $VO_2$ is observed. The other diffractogram corresponds to a $VPO_4$ obtained from a mixture containing 200% of added water: in this case, the $VO_2$ peak is not observed.

THE INVENTION

The invention relates to a process for preparing the phosphate of formula $(NH_4)(VO_2)(HPO_4)$ consisting in stirring a mixture formed of $V_2O_5$ and of $NH_4H_2PO_4$ in the solid state to which water was added in an initial proportion of between 0.1% and 200.0%, this proportion being calculated relative to the whole of the mixture.

The reaction between the two reactants is written:

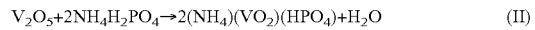
$$V_2O_5 + 2NH_4H_2PO_4 \rightarrow 2(NH_4)(VO_2)(HPO_4) + H_2O \quad (II)$$

The starting mixture denoted hereinafter by the term "precursor mixture" therefore comprises the two reactants, $V_2O_5$ and $NH_4H_2PO_4$, in the solid state and also water. These two reactants are preferably present in the form of powders. Use may be made of powders, the particles of which have a diameter $d_{50}$ of at most 100 μm, or of at most 50 μm, $d_{50}$ being the median diameter obtained from a volume size distribution determined by a Beckman Coulter LS I3 320 model laser particle size analyzer. It is preferable to use a precursor mixture for which the two starting reactants have been intimately mixed.

The vanadium phosphate which is obtained $(NH_4)(VO_2)(HPO_4)$ may be in two polymorphic forms α and β. The reaction (II) may result more in the β form.

To obtain a good quality vanadium phosphate, it is preferable to use a precursor mixture close to the stoichiometry of the reaction (II). Use may thus be made, for example, of a precursor mixture comprising $V_2O_5$ and $NH_4H_2PO_4$ in an initial V/P molar ratio of between 0.9 and 1.1, or between 0.95 and 1.05.

The precursor mixture comprises water in a given proportion of at most 200.0%, for example between 0.1% and 200.0%, or between 1.00% and 200.0%, this proportion being calculated by weight relative to the whole of the two reactants (i.e. $V_2O_5$ and $NH_4H_2PO_4$). The proportion of water is therefore given by the formula [mass of water/mass of $V_2O_5+NR_4H_2PO_4 \times 100$]. This proportion may be at least 0.5%, or at least 0.7% or even at least 1.0%. It will be noted that this is the initial proportion of water which is added since this proportion may vary in the course of the reaction depending in particular on the progress of the reaction (II) and on the temperature at which this reaction is carried out.

Surprisingly, the water which is added has the function of accelerating the chemical reaction between the two starting reactants. This effect is observed even using a small proportion of water. Thus, as can be seen in the examples, it may be observed that in the presence of even a small proportion of added water of the order of 1.0%, it is possible to obtain the phosphate with a good purity and a good yield after 120 min in contrast to several tens of hours without addition of water. Starting from a certain proportion, the added water also makes it possible to fluidify the starting mixture, which makes it possible to favor the mechanical mixing operation. It should be mentioned that the use of any liquid is not suitable even if the liquid is capable of fluidifying the mixture. Thus, for example, tests carried out in the presence of anhydrous ethanol or of a liquid hydrocarbon did not make it possible to obtain the same effect The preparation of the precursor mixture is based on the mixing of $V_2O_5$, of $NH_4H_2PO_4$ and of water in any order. It is possible for example, according to a first procedure, to intimately mix the two powders, add water to the mixture of the two powders and then mix everything so as to obtain the precursor mixture. It is also possible, according to a second procedure, to firstly add water to one of the two reactants, then to intimately mix the reactant to which the water was added with the other reactant so as to obtain the precursor mixture. This is why it will be noted that the term "added" used in the present application means that, in the calculation of the proportion of water, the water optionally present initially in the two reactants is not taken into account (in this respect, the compound $NH_4H_2PO_4$ is known to be hydroscopic so that it may contain traces of water). The term "added" thus does not mean that the invention is limited to the first procedure via which the two reactants are mixed in advance before the addition of the water. Put yet another way, the invention also relates to a process for preparing the phosphate of formula $(NH_4)(VO_2)(HPO_4)$ consisting in stirring a mixture formed of $V_2O_5$ and of $NH_4H_2PO_4$, these two reactants both being in the solid state, and also of water, the initial proportion of which is between 0.1% and 200.0%, this proportion being calculated by weight relative to the whole of the two reactants $V_2O_5$ and $NH_4H_2PO_4$ and not taking into account the water optionally present initially in the two reactants.

The precursor mixture may be obtained in a mixing tool suitable for the physical form of the precursor mixture. For example, in the case of a powder of dry appearance, use may be made, on the laboratory scale, of a coffee mill.

Depending on the proportion of water in the precursor mixture, the latter may be in several physical forms. When the proportion of water is low, generally between 0.1% and 10.0%, or between 0.5% and 10.0%, the precursor mixture may be in the form of a powder. This powder appears dry despite the presence of water. The chemical reaction (II) is then carried out using a reactive milling means.

In the reactive milling, which comes under mechanochemistry, a chemical reaction is induced directly during the milling by absorption of mechanical energy. The reactive milling means has the role, on the one hand, of homogenizing the reaction mixture and, on the other hand, of inducing the chemical reaction. The reactive milling means may for example be a ball mill, a jar mill, a planetary mill, a vibratory mill or an extruder. The powder recovered consists of the vanadium phosphate $(NH_4VO_2HPO_4)$. It is optionally possible to screen the powder recovered in order to obtain a powder of desired particle size.

The precursor mixture may also be in the form of a relatively thick and viscous dispersion. The proportion of water is then generally between 10.0% and 50.0%. The mixture was then stirred with any mixing tool suitable for viscous media, such as for example a kneader. When the reaction progresses, it is observed that the viscosity of the mixture increases resulting in a viscous paste.

When the proportion of water is higher, generally between 50.0% and 200.0%, the precursor mixture is in the form of a fluid dispersion. It is then possible to stir the mixture using a propeller agitator or an inclined-blade agitator. When the reaction progresses, it is observed that the viscosity of the mixture increases resulting in a viscous paste. The increase in viscosity may make the stirring more difficult, especially as the reaction is carried out at a temperature close to ambient temperature, for example at a temperature between 20° C. and 30° C. Thus, to facilitate the stirring of the mixture, the proportion of water is preferably at least 75.0%, or at least 80.0%. The proportion may be between 75.0% and 150.0%, or between 80.0% and 150.0%.

Above a proportion of 200.0%, it was observed that the vanadium phosphate is capable of re-dissolving in the water and resulting in a product containing the vanadium phosphate accompanied by a second phase of $NH_4VO_{0.64}P_{0.33}O_3$ and $NH_4H_2PO_4$ type. This mixture is capable, during the calcination and during the decomposition thereof, of giving a $VPO_4$ containing an impurity deficient in phosphate of $V_{O2}$ type.

The reaction (II) may be carried out at a temperature which does not have to be high. Thus, this temperature may be at most 100° C., or at most 60° C., or even at most 30° C. The reaction time depends on the amount of water added, on the state of division of the solids used at the start and also on the physical form of the precursor mixture. This time is generally between 2 h and 60 h.

It is possible to follow the state of progression of the reaction (II) according to several methods. A visual first method consists in ultrasonically dispersing 15 mg of a sample drawn off during the reaction in 5 ml of deionized water. When some starting reactants remain, the mixture thus formed is in the form of an opaque dispersion whereas when the progression is well advanced, the mixture thus formed is in the form of a translucent solution of bright yellow color. More quantitatively, according to a second method, it is possible to follow the chemical reaction by analyzing, using an x-ray diffractometer (XRD), the samples drawn off during the reaction. The characteristic peaks of the starting reactants gradually disappear. It was observed that the peaks of these reactants are still visible when 5% of $V_2O_5$ or else 5% of $NH_4H_2PO_4$ is added to pure vanadium phosphate. As it is observed that it is possible to obtain diffractograms of the final product without the presence of characteristic peaks of the two starting reactants, it is thus possible to conclude that the final product contains less than 5% by weight of $V_2O_5$ and less than 5% by weight of $NH_4H_2PO_4$.

The process of the invention may result in a vanadium phosphate of good purity. This vanadium phosphate may contain less than 5% by weight, more particularly less than 3% by weight, or less than 1% by weight of residual $V_2O_5$. This vanadium phosphate may contain less than 5% by weight, more particularly less than 3% by weight, or less than 1% by weight of residual $NH_4H_2PO_4$. The proportion of these compounds may be determined by any analytical technique that makes it possible to give the content of these compounds with a sufficient accuracy within these concentration ranges. This may be, for example, infrared spectroscopy.

The process thus described therefore makes it possible to obtain a vanadium phosphate with a good yield. Furthermore, this process has the following advantages which have already been outlined above:
- the reaction makes it possible to prevent unnecessary discharges of the starting reactants;
- the process is simple to implement since it is sufficient to recover the product resulting from the reaction (II) without having to wash it or purify it. It may just be necessary to screen this product and/or to dry it in order to eliminate the water.

The invention also relates to the phosphate of formula $(NH_4)(VO_2)(HPO_4)$ capable of being obtained by the process of the invention.

The vanadium phosphate $NH_4VO_2HPO_4$ is converted into $VPO_4$ (vanadium orthophosphate) by heating the vanadium phosphate in a reducing environment at a temperature of at least 800° C. The reducing environment may be based on hydrogen, such as a mixture of an inert gas such as argon and dihydrogen, or based on carbon black. An example of conversion is given by the reaction (I) and in this case the reducing environment is formed by carbon black which is added to the reactants.

The temperature at which the conversion to $VPO_4$ takes place is preferably between 800° C. and 1000° C. in order to develop the crystallinity of the product ($VPO_4$ of orthorhombic structure) while avoiding the decomposition of the $VPO_4$. It is preferable to use a vanadium phosphate that has a low content of residual impurities. Thus, it is possible to use a vanadium phosphate containing less than 5% by weight, more particularly less than 3% by weight, or less than 1% by weight of residual $V_2O_5$, or else a vanadium phosphate containing less than 5% by weight, more particularly less than 3% by weight, or less than 1% by weight of residual $NH_4H_2PO_4$.

It was also observed that it is possible to carry out the conversion without using hydrogen. The invention thus also relates to a process for preparing $VPO_4$ from a phosphate of formula $(NH_4)(VO_2)(HPO_4)$ or from a mixture formed of $V_2O_5$ and of $NH_4H_2PO_4$, consisting in heating, to a temperature of at least 800° C., the phosphate or the mixture in a confined environment so that the $NH_3$ which is released by the reaction or a portion of this $NH_3$ remains in contact with the reaction mixture. The vanadium phosphate $(NH_4)(VO_2)$ $(HPO_4)$ used in this conversion may be prepared according to the process which was described above and which uses a precursor mixture containing water.

It is possible to ensure that the environment is confined by preventing the $NH_3$ formed during the conversion reaction from escaping from the environment in which the reaction takes place. In the examples, the crucibles in which the conversion reaction takes place are covered with a lid. In the case where the conversion reaction takes place on a larger scale, it is possible to use a reactor which is closed so as to contain the $NH_3$ which is released. It is not necessary for the reactor to be hermetically sealed, it is sufficient that the $NH_3$ released remains contained in the reactor during the conversion reaction. Furthermore, it is important to minimize the amount of residual oxygen in the reactor to avoid the oxidation of the $VPO_4$. One means for doing this consists in ensuring that the reaction mixture fills a large volume of the closed reactor. It is also possible to avoid the presence of oxygen by means of a flushing of the reactor with an inert gas such as for example nitrogen or argon. This flushing may be carried out before the start of the conversion reaction and/or during this reaction. Thus, it is possible to fill the reactor with an inert gas prior to the reaction, to charge the reactor with the reactants, then to close the reactor to prevent the re-entry of oxygen.

The duration of the heating leading to the $VPO_4$ is not critical and depends on the temperature used. It may generally be between 30 min and 5 h. In the examples, a calcination at 800° C. for 3 h made it possible to obtain the desired $VPO_4$.

It is also possible to mix carbon black with the vanadium phosphate $(NH_4)(VO_2)(HPO_4)$ or with a mixture formed of $V_2O_5$ and of $NH_4H_2PO_4$. In this case, compared to the known carboreduction process, it is possible to use less carbon black since, in this case, the reduction takes place in the presence both of $NH_3$ and also of the carbon black which was added.

The vanadium phosphate $NH_4VO_2HPO_4$/carbon black mixture may be prepared ex situ from the vanadium phosphate furthermore already prepared, in particular by the process in the presence of water described above. It is also possible to prepare the mixture in situ from $V_2O_5$ and $NH_4H_2PO_4$. In this case, carbon black is added directly to the mixture formed of $V_2O_5$ and of $NH_4H_2PO_4$.

The $VPO_4$ may be used for the preparation of NVPF. In order to do this, a mixture formed of $VPO_4$, with an effective amount of sodium fluoride, NaF, and at least one hydrocarbon- and oxygen-containing compound, a source of elemental carbon, is exposed, under an inert atmosphere, to temperature conditions suitable for obtaining the NVPF. Thus, the invention also relates to a process for preparing NVPF comprising the following steps:
- during a $1^{st}$ step, preparing $VPO_4$ by heating a phosphate of formula $(NH_4)(VO_2)(HPO_4)$ or a mixture formed of $V_2O_5$ and of $NH_4H_2PO_4$ to a temperature of at least 800° C. in a confined environment so that the $NH_3$ which is released by the reaction or a portion of this $NH_3$ remains in contact with the reaction mixture, it being possible for this reaction to optionally take place in the presence of carbon black mixed with the reactant(s);
- during a $2^{nd}$ step, exposing, under an inert atmosphere, a mixture formed of the $VPO_4$ from step 1, with an effective amount of sodium fluoride, NaF, and optionally at least one hydrocarbon- and oxygen-containing compound, a source of elemental carbon, to temperature conditions suitable for obtaining NVPF.

Everything which was seen above for the $VPO_4$ preparation process applies in exactly the same way for the NVPF preparation process.

At the end of step 2, the NVPF may optionally be washed with water and dried.

Step 2 uses a mixture formed of sodium fluoride, as a source both of sodium ions and of fluoride ion, and optionally at least one hydrocarbon- and oxygen-containing compound capable of generating elemental carbon. The mixture comprises $VPO_4$ and NaF preferably in a stoichiometric ratio.

As regards the hydrocarbon- and oxygen-containing compound, it may in particular be a sugar such as for example glucose, saccharose and fructose or a carbohydrate such as for example starch or a cellulose derivative. More preferentially, it is a cellulose derivative and more particularly still microcrystalline cellulose. The decomposition of the hydrocarbon- and oxygen-containing compound during step 2 is dedicated, on the one hand, to covering the NVPF with a layer of conductive carbon and, on the other hand, to providing increased protection for the $V^{3+}$ vanadium ions against a phenomenon of oxidation to $V^{4+}$ during the heat treatment. The proportion of the hydrocarbon- and oxygen-containing compound in the mixture based on $VPO_4$ and NaF may be between 1.0% and 50.0% by weight, this proportion being calculated relative to the whole of the $VPO_4$, NaF and hydrocarbon- and oxygen-containing compound mixture. For example, such a mixture may comprise 160 g of $VPO_4$, 70 g of NaF and 23 g of cellulose.

Step 2 is carried out under temperature conditions suitable for obtaining the NVPF. The temperature may be at least 700° C. It may be, for example, between 800° C. and 1000° C.

The NVPF is suitable for use as electrode active material for sodium batteries or for sodium-ion batteries. The invention also relates to the NVPF capable of being obtained by the process which has just been described.

EXAMPLES

Example 1 (Comparative): Preparation of the Phosphate by Reactive Milling

The test was carried out at ambient temperature, in air, using a 200 ml cylindrical polyethylene container filled with alumina balls (5 mm and 20 mm diameter). The container is filled with:
- 28.0 g of $V_2O_5$;
- 35.4 g of $NH_4H_2PO_4$;
- 66 g of balls with a 5 mm diameter+120 g of balls with a 20 mm diameter.

The container is rotated about its axis of symmetry at the speed of 1 rotation/s, which makes it possible to mix the precursor mixture and to promote the reaction between $V_2O_5$ and $NH_4H_2PO_4$. During the milling, samples (1 g) of the mixture are drawn off at several moments (2 h; 8 h; 24 h; 32 h; 48 h and 56 h). It is possible to follow, during the milling, the evolution of the color of the mixture: passing from a brown color to an intense yellow color. It is also possible to follow the evolution of their abilities to dissolve during the dissolving test. The scanning electron microscopy images also make it possible to observe the decrease in the size of the particles forming the powders. X-ray diffraction also makes it possible to observe, during the milling, the appearance of the beta-$NH_4VO_2HPO_4$ phase and the joint disappearance of the two starting reactants ($V_2O_5$ and $NH_4H_2PO_4$).

The phosphate obtained after 56 h of milling is calcined for 3 h at 800° C. in an atmosphere composed of argon and dihydrogen (5% by volume). A $VPO_4$ of good phase purity is obtained.

Example 2 (Comparative): Case of a Mixture Produced by Ball-Free Agitation

Example 1 is reproduced but without the balls. It is then observed, on the one hand, that it is not possible to obtain the phosphate $NH_4VO_2HPO_4$. On the other hand, the calcination of the mixture at the end of the ball-free agitation does not result in $VPO_4$ of good phase purity. Specifically, some of the peaks of the phosphate are detected next to characteristic peaks of $V_2O_3$. Moreover, an image of the crucible obtained in this type of situation clearly shows the inhomogeneity of the product obtained.

Example 2 (Comparative)

Tests for which it is not possible to obtain the vanadium phosphate by milling do not make it possible to obtain a $VPO_4$ of good phase quality.

Example 3 (According to the Invention): Preparation of the Phosphate by Reactive Milling in the Presence of Water (<10%)

It was observed that by repeating example 1 with a precursor mixture comprising water up to a proportion of at most 10% by weight (tests at 0.1%; 1%; 10%), it is possible to obtain the phosphate with a good purity in only 2 hours. The precursor mixture is present in this case in the form of a powder of dry appearance.

Example 4 (According to the Invention): Preparation of the Vanadium Phosphate by Agitation in the Presence of Water (>100%)

When the precursor mixture comprises more than 100% of water, it is in the form of a dispersion, which is vigorously agitated with a Turbula mixer. This mixer operates with a three-dimensional movement and the container in which the reaction mixture is placed is subjected to a continually changing rhythmic pulsed movement. It is observed that the viscosity of the mixture increases in the course of the reaction.

It was furthermore observed that above a proportion of water of 200% (tests at 500%, 1000% and 2000%), the presence of compounds having the formula $NH_4VO_{0.64}P_{0.33}O_3$ (substoichiometric compound) and $NH_4H_2PO_4$ and which would appear to originate from the partial dissolution of the phosphate $NH_4VO_2HPO_4$ is detected on the x-ray diffractograms. After heating at 800° C., the formation of $VPO_4$ and $VO_2$ is observed (FIG. 3). This was not observed for a proportion of water of less than or equal to 200%.

It is also observed that the reaction appears slower above 200%.

Example 5 (Comparative): Replacement of Water with Anhydrous Ethanol

The test carried out under the conditions of example 4, replacing the water with 200% ethanol did not make it possible, even after a prolonged milling of 30 h, to obtain a VPO$_4$ of good phase purity after calcination at 800° C. in an Ar/H$_2$ atmosphere.

Example 6 (According to the Invention): Use of a Confined Atmosphere During the Preparation of the Phosphate VPO$_4$ It is possible to calcine NH$_4$VO$_2$HPO$_4$ in an Ar/H$_2$ atmosphere at 800° C. for 3 h in order to obtain VPO$_4$ with a good phase purity. It was also observed that the calcination at 800° C. for 3 h of NH$_4$V$_{O2}$HPO$_4$ in a confined environment (crucibles sealed with a lid) may result in an autogenous reduction. In this case, the vanadium with the degree of oxidation V is reduced by the ammonia emitted during the decomposition of the product. In an unconfined environment, it was observed on the contrary that the compounds VOPO$_4$ and VOPO$_7$ are formed, which correspond to the oxidized forms.

Example 7 (According to the Invention): Calcination of NH$_4$VO$_2$HPO$_4$ in the Presence of a Carbon-Based Reducing Agent (Carbon Black) in a Confined Environment Under the conditions of example 6, use was made of a mixture composed of vanadium phosphate and carbon black. In this case, the lowest presence of V$_4$(P$_2$O$_7$)$_3$ was observed with a content of the order of a few % only.

The invention claimed is:

1. A process for preparing a phosphate of formula (NH$_4$)(VO$_2$)(HPO$_4$), the process consisting of stirring a mixture of V$_2$O$_5$ and of NH$_4$H$_2$PO$_4$ in the solid state and adding water in an initial proportion of between 0.1% and 200.0%, this proportion being calculated relative to the whole of the two reactants V$_2$O$_5$ and NH$_4$H$_2$PO$_4$, wherein V$_2$O$_5$ and NH$_4$H$_2$PO$_4$ are powders that comprise particles having a diameter d$_{50}$ of at most 100 μm, d$_{50}$ being a median diameter obtained from a volume size distribution determined by a laser particle size analyzer.

2. A process for preparing a phosphate of formula (NH$_4$)(VO$_2$)(HPO$_4$), the process consisting of stirring a mixture of V$_2$O$_5$ and of NH$_4$H$_2$PO$_4$, both in the solid state, and also of water, an initial proportion of which is between 0.1% and 200.0%, this proportion being calculated by weight relative to the whole of the two reactants V$_2$O$_5$ and NH$_4$H$_2$PO$_4$ and not taking into account water optionally present initially in the two reactants, wherein V$_2$O$_5$ and NH$_4$H$_2$PO$_4$ are powders that comprise particles having a diameter d$_{50}$ of at most 100 μm, d$_{50}$ being a median diameter obtained from a volume size distribution determined by a laser particle size analyzer.

3. The process as claimed in claim 1, wherein the mixture of V$_2$O$_5$ and of NH$_4$H$_2$PO$_4$ is present in an initial V/P ratio of between 0.9 and 1.1.

4. The process as claimed in claim 1, wherein the mixture of V$_2$O$_5$ and of NH$_4$H$_2$PO$_4$ is in a form of a powder, a paste or a fluid dispersion.

5. The process as claimed in claim 1, wherein the mixture is subjected to reactive milling.

6. The process as claimed in claim 1, wherein the process is conducted at a temperature of at most 100° C.

7. The process as claimed in claim 1, wherein the phosphate of formula (NH$_4$)(VO$_2$)(HPO$_4$) contains less than 5% by weight of residual V$_2$O$_5$.

8. The process as claimed in claim 1, wherein the phosphate of formula (NH$_4$)(VO$_2$)(HPO$_4$) contains less than 5% by weight of residual NH$_4$H$_2$PO$_4$.

9. The process as claimed in claim 1, wherein a product derived from the reaction is screened and/or dried to eliminate the water.

10. The process as claimed in claim 1, wherein the initial proportion of water is:
between 0.5% and 200.0%.

11. A process for preparing VPO$_4$ from a phosphate of formula (NH$_4$)(VO$_2$)(HPO$_4$), obtained by the process of claim 1, the process consisting of heating, to a temperature of at least 800° C., a reaction mixture comprising the phosphate in a confined environment so that NH$_3$ is released by the reaction mixture, and said NH$_3$ remains in contact with the reaction mixture.

12. The process as claimed in claim 11, wherein carbon black is mixed with the phosphate of formula (NH$_4$)(VO$_2$)(HPO$_4$).

13. A process for preparing NVPF of formula Na$_3$V$_2$(PO$_4$)$_2$F$_3$, the process comprising:
preparing VPO$_4$ by heating a reaction mixture comprising a phosphate of formula (NH$_4$)(VO$_2$)(HPO$_4$), obtained by the process of claim 1, to a temperature of at least 800° C. in a confined environment so that NH$_3$ is released by the reaction mixture, and said NH$_3$ or a portion thereof remains in contact with the reaction mixture, optionally in the presence of carbon black;
exposing, under an inert atmosphere, the VPO$_4$ to sodium fluoride in a stoichiometric ratio of 1:1.5, VPO$_4$:NaF, and optionally at least one hydrocarbon- and oxygen-containing compound, a source of elemental carbon, to temperature conditions suitable for obtaining NVPF.

14. The process as claimed in claim 1 wherein V$_2$O$_5$ and NH$_4$H$_2$PO$_4$ are in the form of powders, the particles of which have a diameter d$_{50}$ of at most 50 μm, d$_{50}$ being the median diameter obtained from a volume size distribution determined by a laser particle size analyzer.

15. The process as claimed in claim 3, wherein the mixture of V$_2$O$_5$ and of NH$_4$H$_2$PO$_4$ is present in an initial V/P ratio of between 0.95 and 1.05.

16. The process as claimed in claim 7, wherein the phosphate of formula (NH$_4$)(VO$_2$)(HPO$_4$) contains less than 1% by weight of residual V$_2$O$_5$.

17. The process as claimed in claim 8, wherein the phosphate of formula (NH$_4$)(VO$_2$)(HPO$_4$) contains less than 1% by weight of residual NH$_4$H$_2$PO$_4$.

18. The process as claimed in claim 10, wherein the initial proportion of water is:
between 0.5% and 10.0%; or
between 80.0% and 150.0%.

* * * * *